J. W. MERICKEL.
AIR AND WATER DISPENSING APPARATUS.
APPLICATION FILED DEC. 24, 1920.
1,406,471.
Patented Feb. 14, 1922.
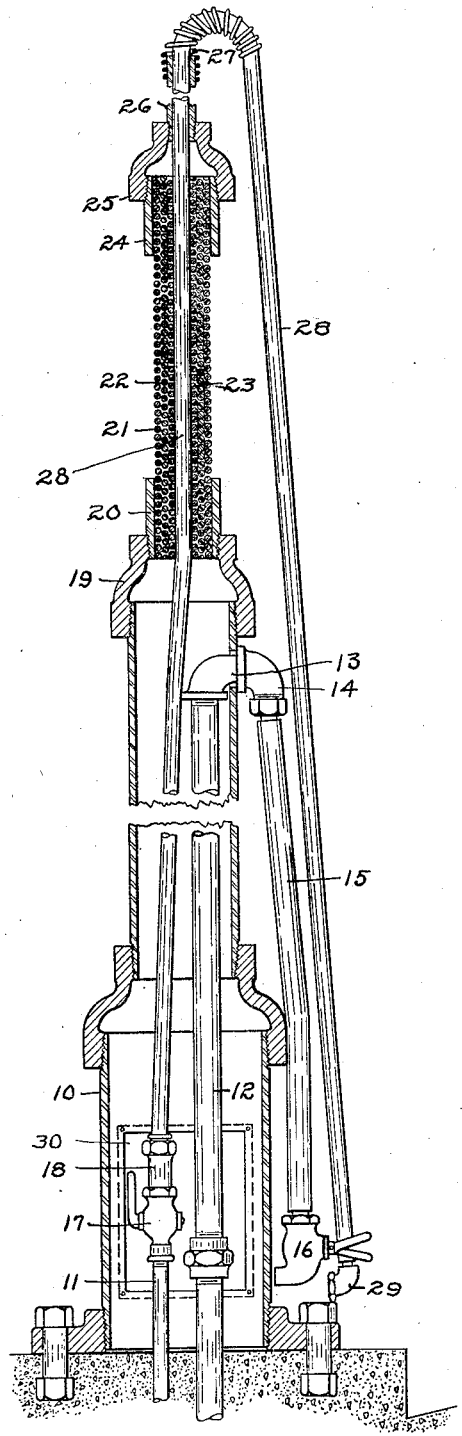
INVENTOR.
John W. Merickel
BY Elwin M. Hulse
ATTORNEY.

UNITED STATES PATENT OFFICE.

JOHN W. MERICKEL, OF MIAMI, FLORIDA.

AIR AND WATER DISPENSING APPARATUS.

1,406,471.  Specification of Letters Patent.  Patented Feb. 14, 1922.

Application filed December 24, 1920. Serial No. 433,018.

*To all whom it may concern:*

Be it known that I, JOHN W. MERICKEL, a citizen of the United States, residing at Miami, in the county of Dade and State of Florida, have invented new and useful Improvements in Air and Water Dispensing Apparatus, of which the following is a specification.

The invention relates to apparatus for dispensing air under pressure and water to motor vehicles. In order that air for filling tires and water for the radiators of motor vehicles shall be available at garages, filling stations and the like, rubber hose is generally connected to the sources of supply, the air hose, preferably, being of sufficient length to reach each of the wheels of the vehicle. Unless the hose are properly supported they drag on the ground or floor, and the vehicle may be driven over them, all to the injury to the hose.

The object of the invention is to provide an apparatus by which the air and water hose are supported off the ground in readily accessible manner, and by which after use the air hose is automatically returned to an elevated position clear of the ground.

The invention consists in the novel combination and construction of parts hereinafter described and illustrated in the drawing, in which drawing—

The figure is a vertical section of a device constructed in accordance with the invention.

Referring to the drawing 10 indicates a suitable housing, adapted to be suitably secured to the ground or sidewalk or a floor. 11 is a supply pipe leading into the housing from a source of air under pressure and 12 is a source of water supply having a suitable union 13 extending through the wall of the housing and supporting a hose connection 14 to which hose 15 is connected. A suitable valved nozzle 16, preferably closing automatically in its operation, is connected to the opposite end of the hose, the hose being of sufficient length to readily reach the radiator filling opening when the vehicle is drawn up to the apparatus. The support 14 is at the proper height to permit the hose to hang down without touching the ground.

A suitable valve 17 is connected to the air pipe 11 and 18 is a suitable hose connection secured to or part of the valve, door 30 in the housing providing access to the valve.

A reducing nipple 19 is threaded on the upper end of the housing and a sleeve 20 is threaded at one end into the nipple. Three concentric coiled springs 21, 22, 23 are in successively contacting relation and are suitably secured at one end in sleeve 20, the opposite end of the springs being secured in sleeve 24 secured to nipple 25. A hose supporting member or pipe 26 is secured at one end to nipple 25 and a coiled spring 27 is secured to the opposite end of member 26.

Hose 28 is extended through spring 27, member 26 and the innermost spring 23, and its lower end is secured to coupling 18, an air valve 29 of approved design being secured to the outer end of the hose.

Springs 21, 22 and 23 tend to retain the hose support 26 in upright position but permit it to have universal movement on the housing at the will of the user. In the upright position of member 26 the portion of the hose projecting from it hangs downwardly clear of the ground, spring 27 serving to prevent all sharp bending of the hose at the outer end of the member. By pulling downwardly or outwardly on the hose, member 26 readily tilts or swings laterally to permit the valve 29 to be connected to the tire of any one of the wheels of the vehicle. Upon releasing the hose the springs restore member 26 slowly to upright position, the slow movement of member 26 and consequent withdrawal of the hose being the result of successive engagement of the springs 21, 22 and 23. The slow restoring movement of the springs is very desirable since if the movement is rapid the hose will be pulled up suddenly and will swing around with considerable force resulting in injury not only to itself but to the user or a passerby or to an object adjacent the stand, such as the motor vehicle or a window in a building adjacent the dispensing apparatus. Member 26 is of such length that when tilted toward the vehicle the hose 28 will extend down on the far side of the motor vehicle where it may be readily attached to the tires on said side.

What I claim is:

1. The combination with a housing having therein a supply pipe for air under pressure, a plurality of coiled springs one within another and in successively contacting relation secured at one end to the housing, a hose supporting member secured to the opposite end of said springs adapted to be maintained in upright position by said springs and capable of universal movement on the housing and a hose connected to the supply pipe and carried by the supporting member and depending from the outer end of said member.

2. The combination with a housing having therein a supply pipe for air under pressure, a hose supporting member a plurality of concentric coiled springs in successively containing relation connecting the supporting member to the housing and tending to maintain the supporting member in upright position and a hose connected to the supply pipe and extending through the coiled springs and the hose supporting member and depending from the outer end of the latter member.

3. The combination with a housing having therein a supply pipe for air under pressure and a water supply pipe, a discharge hose exterior of the housing and connected to the water supply pipe, a hose supporting member, a plurality of concentric springs in successively contacting relation connecting the hose supporting member to the housing for universal movement of the member on the housing and a hose connected to the air supply pipe and extending through the spring member and the hose supporting member and depending from the outer end of the latter member, the coiled spring member tending to maintain the hose supporting member in upright position.

4. The combination with a housing having therein a supply pipe for air under pressure and a water supply pipe, a discharge hose exterior of the housing and connected to the water supply pipe, a valve at the opposite end of the hose to control the discharge of water therefrom, a hose supporting member, a plurality of concentric springs in successively contacting relation connecting the hose supporting member to the housing for universal movement of the member on the housing and a hose connected to the air supply pipe and extending through the spring member and the hose supporting member and depending from the outer end of the latter member, the coiled spring member tending to maintain the hose supporting member in upright position.

In witness whereof I have hereunto subscribed my name this 23rd day of December, 1920.

JOHN W. MERICKEL.